United States Patent [19]
Motoyama

[11] Patent Number: 5,818,603
[45] Date of Patent: Oct. 6, 1998

[54] METHOD AND SYSTEM FOR CONTROLLING AND COMMUNICATING WITH MACHINES USING MULTIPLE COMMUNICATION FORMATS

[75] Inventor: Tetsuro Motoyama, Santa Clara, Calif.

[73] Assignees: Ricoh Company, Ltd., Tokyo, Japan; Ricoh Corporation, San Jose, Calif.

[21] Appl. No.: 624,228

[22] Filed: Mar. 29, 1996

[51] Int. Cl.⁶ .......................... H04M 11/00; G06F 15/00
[52] U.S. Cl. .......................... 358/296; 358/434; 358/468; 395/114; 379/93.08
[58] Field of Search .................... 358/296, 401, 358/403, 405–408, 434–436, 438–440, 468; 399/1, 9–12; 379/1, 28, 29, 63, 93, 100, 102, 106, 93.08; 395/114

[56] References Cited

U.S. PATENT DOCUMENTS

| | | | |
|---|---|---|---|
| 5,412,779 | 5/1995 | Motoyama | 395/275 |
| 5,533,175 | 7/1996 | Lung et al. | 395/114 X |
| 5,566,278 | 10/1996 | Patel et al. | 395/114 |
| 5,577,105 | 11/1996 | Baum et al. | 379/93 |

*Primary Examiner*—Peter S. Wong
*Assistant Examiner*—Gregory J. Toatley, Jr.
*Attorney, Agent, or Firm*—Oblon, Spivak, McClelland, Maier & Neustadt, P.C.

[57] ABSTRACT

A method and system which allows a remote monitoring and diagnostic computer or system to communicate using different communication protocols which are stored within a data base. After a communication is received, it is analyzed to determine if there is a protocol identifier. If the protocol identifier exists, a data base is searched to determine the format of the header of the communication. Once the format of the header is determined, the header of the received communication is read to determine the information contained therein. This information is utilized to determine the actual format of the data which follows. If the protocol identifier does not exist, the received communication is examined to determine if it is in a format which matches one of a plurality of previously defined format. Critical fields are defined which must have certain values and if the received communication matches these critical values, the record in a communication protocol data base matching the critical values will be utilized in order to determine the protocol of the data which has been received in the communication. The machine to which the remote monitoring and diagnostic system is connected is a business office device such as a copier, printer, or facsimile machine, a digital camera, or another type of device.

31 Claims, 15 Drawing Sheets

FIG. 6

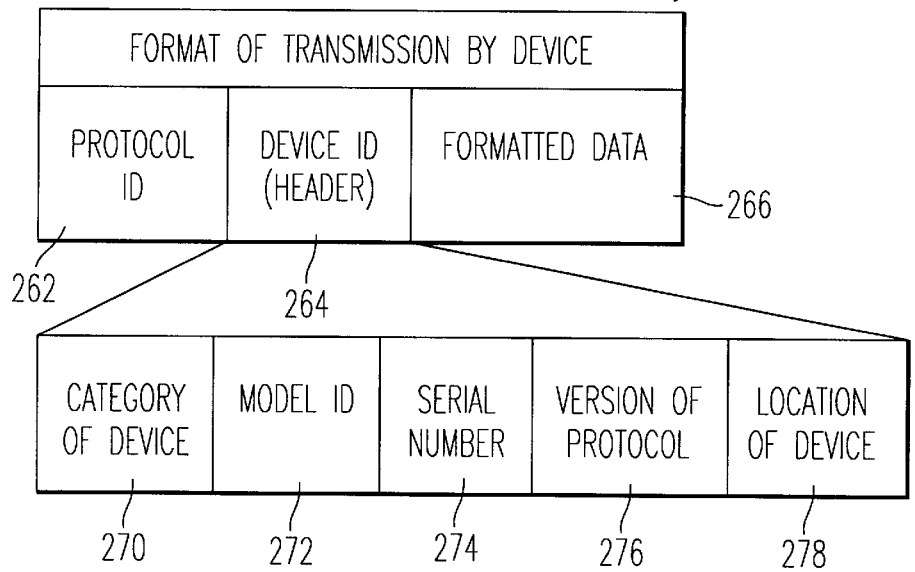

| FORMAT OF TRANSMISSION BY DEVICE | | |
|---|---|---|
| PROTOCOL ID | DEVICE ID (HEADER) | FORMATTED DATA |

| CATEGORY OF DEVICE | MODEL ID | SERIAL NUMBER | VERSION OF PROTOCOL | LOCATION OF DEVICE |
|---|---|---|---|---|

FIG. 7

| PROTOCOL IDENTIFIER DATA BASE | | |
|---|---|---|
| PROTOCOL IDENTIFIER | IDENTIFIER (HEADER) VERSION | FORMAT OF HEADER |
| AB AB BC BC CD CD | 01 01 | 4 BYTES DEVICE CATEGORY, 10 BYTES MODEL ID, 15 BYTES SERIAL NUMBER 5 BYTES VERSION OF PROTOCOL, 50 BYTES LOCATION OF DEVICE |
| AB AB BC BC CD CD | 01 02 | 4 BYTES DEVICE CATEGORY, 10 BYTES MODEL ID, 20 BYTES SERIAL NUMBER, 5 BYTES VERSION OF PROTOCOL, 50 BYTES LOCATION OF DEVICE |
| AA AA AA AA AA AB | 01 01 | 2 BYTES DEVICE CATEGORY, 10 BYTES MODEL ID, 20 BYTES SERIAL NUMBER, 2 BYTES VERSION OF PROTOCOL, 40 BYTES LOCATION OF DEVICE |
|  |  |  |

*FIG. 8*

| \multicolumn{6}{c}{INPUT FORMAT DATA BASE} |||||||
|---|---|---|---|---|---|
| CATEGORY OF DEVICE | MODEL ID | VERSION OF PROTOCOL | FORMAT TYPE | INPUT FORMAT | NUMBER INSTALLED |
| COPIER | FT1150 | 1.0 | B | (INT 32/1, COUNT) (INT 16/2, JAM COUNT) | 40,000 |
| COPIER | FT20 | 1.0 | TLV | TLV FORMAT 1 | 70,000 |
| FACSIMILE MACHINE | PF32 | 2.0 | TV | TV FORMAT 3 | 100,000 |
| PRINTER | PR-101 | 2.0 | TLV | TLV FORMAT 3 | 70,000 |
| DIGITAL CAMERA | DC-1 | 1.0 | TLV | TLV FORMAT 5 | 15,000 |
|  |  |  |  |  |  |

FIG. 9

| COMMUNICATION PROTOCOL DATA BASE | | | | |
|---|---|---|---|---|
| DEVICE ID (HEADER) | NUMBER OF MACHINES SUPPORTING PROTOCOL | METHOD OF IDENTIFYING PROTOCOL | LOCATION OF DATA FORMATS OF PROTOCOL | CRITICAL FIELDS WHICH ID PROTOCOL |
| (SEE SPECIFICATION) | 99,000 | HEADER IDENTIFICATION | CSS DATA DB (Fig.10) | (SEE SPECIFICATION) |
| NONE | 5,000 | FIXED FORMAT | FORMAT OF LOCATION INFORMATION | (SEE SPECIFICATION) |
| | | | | |

FIG. 10

| CSS DATA. DB | | |
|---|---|---|
| FORMAT ID | FORMAT TYPE | DATA FORMAT |
| 1 | B | (INT 16, JAM COUNT) (BYTES 1, ATTACHMENT ((BIT 1, SORTER) (BIT 2, LARGE CAPACITY) (BIN 3, STAPLER))) (INT 32, COUNT) |
| 2 | B | (INT 32, COUNT) |
| 3 | TV | TV FORMAT 1 |
| | | |

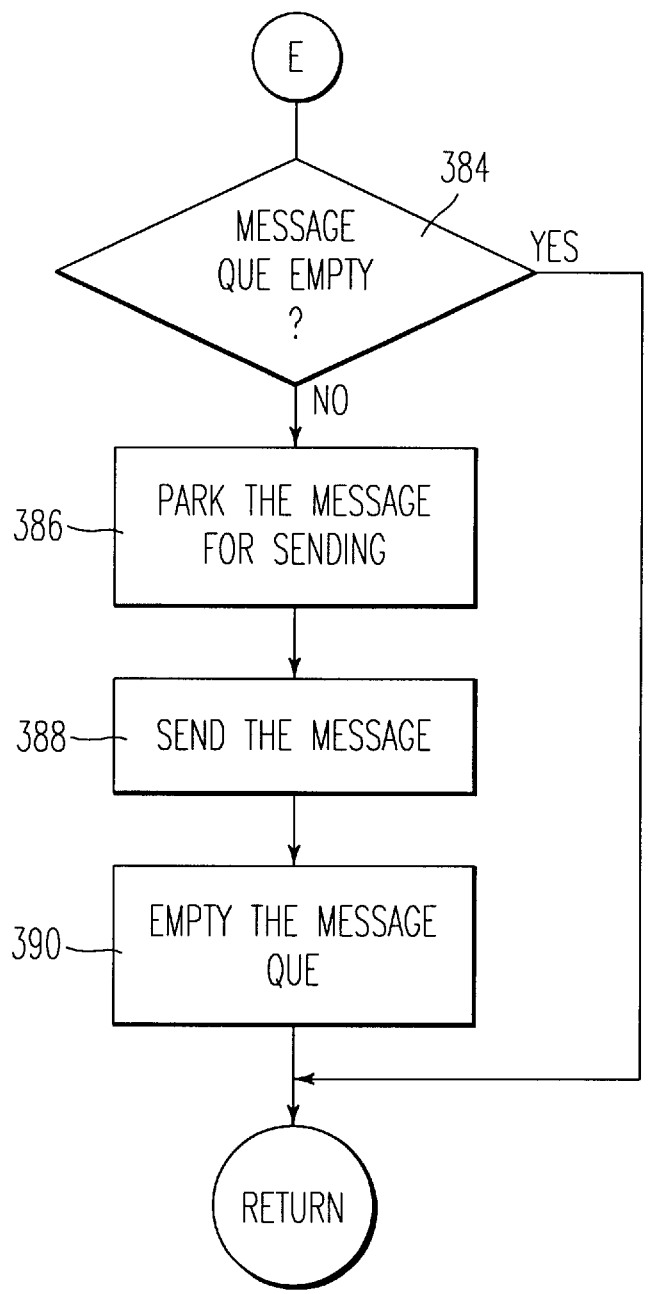

FIG. 13

| 1  | 2  | 3  | 4  | 5  | 6  | 7  | 8  | 9  | 10 | 11 | 12 | 13 | 14 | 15 | 16 | 17 | 18 | 19 | 20 | 21 | 22 |
|----|----|----|----|----|----|----|----|----|----|----|----|----|----|----|----|----|----|----|----|----|----|
| AB | AB | BC | BC | CD | CD | 01 | 01 | 00 | 00 | 00 | 02 | 00 | 00 | 00 | 00 | F  | T  | 4  | 4  | 0  | 0  |

| 23 | 24 | 25 | 26 | 27 | 28 | 29 | 30 | 31 | 32 | 33 | 34 | 35 | 36 | 37 | 38 | 39 | 40 | 41 | 42 | 43 | 44 |
|----|----|----|----|----|----|----|----|----|----|----|----|----|----|----|----|----|----|----|----|----|----|
| 00 | 2  | 4  | 4  | 0  | 0  | 0  | 2  | 4  | 0  | 0  | 1  | 1  | 1  | 1  | 00 | 00 | 10 | 1  | 0  | 0  | 0  |

| 45 | 46 | 47 | 48 | 49 | 50 | 51 | 52 | 53 | 54 | 55-92 | 93 | 94 | 95 | 96 | 97 | 98 |
|----|----|----|----|----|----|----|----|----|----|-------|----|----|----|----|----|----|
| 1  | 0  | 0  | 1  | 4  | 0  | 8  | 9  | 5  | 4  | 5...  | 80 | 01 | 00 | 00 | 04 | 00 |

FIG. 14

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|----|----|----|----|----|----|----|----|----|----|----|----|----|----|----|
| 9 | 5 | 4 | 5 | 4 | 5 | 5 | A | B | - | 1  | 2  | 3  | 4  | 5  | FF | A0 | 4  | 0  | 8  | 00 | 00 | 00 | 02 | 00 |

| 25 | 26 | 27 |
|----|----|----|
| 00 | 04 | 00 |

METHOD AND SYSTEM FOR CONTROLLING AND COMMUNICATING WITH MACHINES USING MULTIPLE COMMUNICATION FORMATS

BACKGROUND OF THE INVENTION

1. Field of the Invention

The present invention is related to communicating with, remote monitoring, diagnosis and control of machines using multiple communication formats. The invention is further related to the ability to upgrade and change the communication format which is to be utilized. The invention is still further related to a control/diagnostic system which has the ability to communicate with different machines such as copiers, printers, facsimile machines and digital cameras using different communication protocols.

2. Discussion of the Background

The communication between a remote diagnostic station and a machine such as a business office device which includes copiers, printers, facsimile machines and combinations thereof is known and disclosed in U.S. Pat. No. 5,412,779 issued to Motoyama and entitled "METHOD AND APPARATUS FOR CONTROLLING AND COMMUNICATING WITH BUSINESS OFFICE DEVICES", which is incorporated herein by reference. However, conventional diagnostic systems do not use varying communication protocols.

In order to have communication with, control of, or diagnostics of machines using different communication protocols, it is possible to have a dedicated control and monitoring system for each model. This would assure an ability to properly communicate using a different diagnostic computer for each type of machine. However, this could be expensive, an inefficient use of resources, and not allow or encourage a rapid development or improvement of communication protocols.

SUMMARY OF THE INVENTION

Accordingly, it is an object of the invention to provide a method and system for communicating with machines which has the capability to use varying communication protocols. It is a further object of the invention to analyze a received communication in order to determine which communication protocol is being used.

It is yet another object of this invention to provide a control/diagnostic system which contains a data base of different communication protocols which can be used to communicate with varying machines such as a facsimile machine, a copier, a printer, a digital copier/printer, a digital camera, or other type of machine.

These and other objects are accomplished by a novel method and system for communicating with machines using multiple communication formats. The control/diagnostic system includes a data base of different communication protocols and formats. The communication protocol is also stored in the machine which is to be monitored or diagnosed.

The control/diagnostic system initially receives a communication from the machine to be controlled or monitored. This initial communication is examined to determine if it begins with a protocol identifier. If the communication does begin with a protocol identifier, a protocol identifier data base is searched to determine if there is an entry corresponding to the protocol identifier. An option of the invention is to determine if a version number of the protocol identifier is stored in the data base.

If there is an entry in the protocol identifier data base corresponding to the protocol identifier contained within the initial communication, the corresponding record of the protocol identifier data base is read in order to determine the format of the header utilized by the communication. The header, also referred to as a device ID because it contains information of the device which transmitted the communication, is then parsed in accordance with the format of the header which is contained in the protocol identifier data base in order to determine various information included in the header such as the category of the device, the model ID, the serial number, the version of the protocol, and the location of the machine. Then an input format data base is searched for a record matching the device defined in the header. If a record is found which matches the information of the header of the communication, then the format information is read from the input format data base in order to be able to properly parse the formatted data which follows the protocol ID and device ID (header) of the transmission from the machine.

If it is determined that the communication from the remote device does not begin with a protocol identifier, a communication protocol data base is searched to determine if the received communication has a header which follows a predefined format. This checking can be done beginning with the format corresponding to the highest number of installed devices. The fields of the received communication which are checked for a match are defined to be critical fields, meaning it is critical for the fields to match in order for the received communication to be identified as following one of the predefined communication protocols.

The communications which begin without a protocol identifier are either in a fixed format, meaning a format which does not change, or a format which is to be identified utilizing a header identification. The method which is to be used is defined in the communication protocol data base.

If the header identification method is to be utilized, the device ID (header) of the received communication is read to obtain the format identification. Once this format identification is obtained, the corresponding data format is looked up in the appropriate location. Alternatively, if the method of identifying the protocol is a fixed format, the format or location information of the format to be used is looked up in the communication protocol data base. In a first embodiment, the format is stored directly in the communication protocol data base. As an alternative, the communication protocol data base stores a file name or location at which the format information can be found. As a further alternative, the format information can be stored in a data base containing the various fixed formats and this data base can be examined to determined the appropriate format.

One the communication protocol or format which is to be utilized has been determined, the incoming communication is parsed according to the format which has been determined. Further, outgoing communications from the diagnostic/control system are formatted to utilize the determined protocol or communication format.

BRIEF DESCRIPTION OF THE DRAWINGS

A more complete appreciation of the invention and many of the attendant advantages thereof will be readily obtained as the same becomes better understood by reference of the following detailed description when considered in connection with the accompanying drawings, wherein:

FIG. 6 illustrates the format of a transmission by the device including the details of the device ID or header of the transmission;

FIG. 7 illustrates a protocol identifier data base which defines the format of the header utilized with the different protocol identifiers;

FIG. 8 illustrates the input format data base which describes the varying input formats utilized by the different devices defines in the data base;

FIG. 9 illustrates the arrangement of the communication protocol data base;

FIG. 10 illustrates a specific data format data base referenced by the communication protocol data base of FIG. 7;

FIGS. 12A–12C illustrate a process of communicating after the format of the communication protocol has been determined;

FIG. 13 illustrates a first example of a communication which utilizes a protocol identifier; and FIG. 14 illustrates a second example of a communication which does not have a protocol identifier.

DESCRIPTION OF THE PREFERRED EMBODIMENTS

Figure 1:
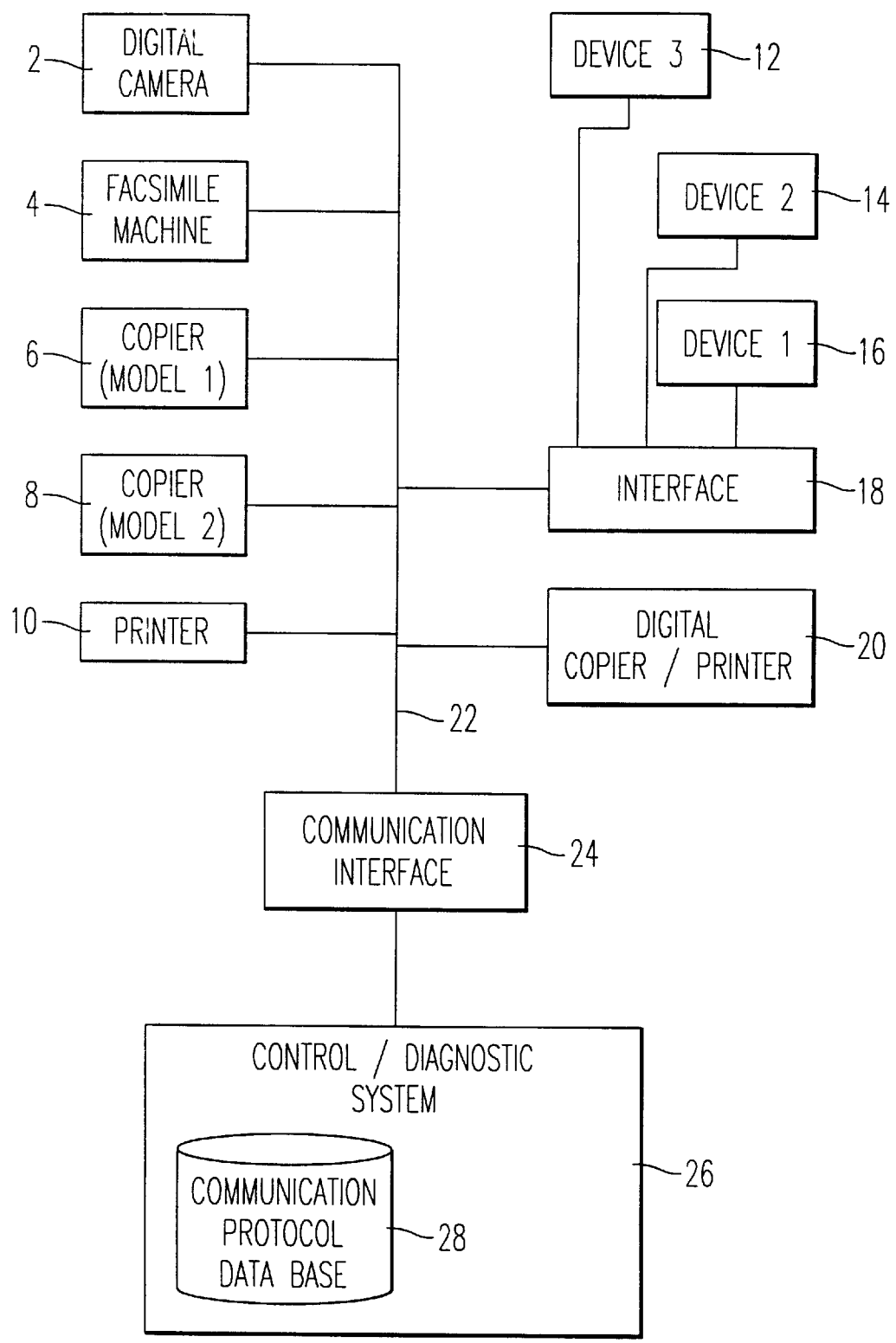
FIG. 1 illustrates a plurality of machines including business office devices and a digital camera connected to a control/diagnostic system.

Referring now to the drawings wherein like reference numerals designate identical or corresponding parts throughout the several views and more particular to FIG. 1 thereof, there is illustrated a plurality of machines connected to a control/diagnostic system 26. The control/diagnostic system 26 includes a data base 28 which stores a plurality of communication protocols for use in communicating with the various machines connected thereto. Any type of machine including machines which perform mechanical functions or have mechanical sensors or electrical-mechanical sensors or actuators are connected to the control/diagnostic system 26 including a digital camera 2 such as the Ricoh DC-1 camera, a facsimile machine 4, or different models of copier machines including copier 6 and copier 8. The control/diagnostic system 26 communicates with the different model copiers using different communication protocols. Of course it is possible for the control/diagnostic system 26 to communicate with a plurality of the same model copiers or machines which use the same communication protocol. Other machines connected to the control/diagnostic system include a printer 10, a digital copier/printer 20, and a device one designated by 16, a device two designated by 14, and device three, designated by 12 connected through the interface 18. These devices 12–16 may be any type of machine to be monitored, controlled or diagnosed including a business office machine. The interface 18 is any type of communication interface which allows a plurality of devices to be connected to the interface 18 and communicate over a communication line 22.

The communication line 22 is connected to the control/diagnostic system 26 through a communication interface 24. This communication interface 24 is any desired type of communication interface including a modem, a LAN (local area network) interface, an internet connection, or any other type of interface. The communication line 22 is any type of communication medium including wires, optical connections, or wireless connections including radio waves or light waves such as infrared waves. Additional manners of communicating which can be utilized by the present invention are disclosed in commonly owned co-pending U.S. patent application Ser. No. 08/463,002 filed Jun. 5, 1995 and entitled "METHOD AND SYSTEM FOR DIAGNOSIS AND CONTROL OF MACHINES USING CONNECTION AND CONNECTIONLESS MODES OF COMMUNICATION", which is incorporated herein by reference. The communication protocol data base 28 contains one or a plurality of data bases which are used to parse or decode incoming communications and encode and format outgoing communications from the control/diagnostic system 26. Details of the communication protocol data base 28 are explained with respect to the data bases illustrated in FIGS. 7–10 which are included within 28.

The control/diagnostic system 26 includes hardware found in a conventional general purpose computer such as a microprocessor, RAM, ROM, display, disk drive such as a hard disk drive, keyboard, etc., connected using a system bus or multiple computers and servers connected by a local area network (LAN), a wide area network (WAN), or both a LAN and WAN.

The control/diagnostic system 26 can initiate communication with the device connected thereto and send a command or request in order to diagnose and/or control the device. The device will then transmit back a response and/or data, and/or perform an action such as moving an actuator, rotating a motor, or perform another operation. Therefore, the control/diagnostic system can cause the device to perform an electrical-mechanical operation because an electrical signal is causing a mechanical operation to take place within the device. When communication is initiated by the control/diagnostic system 26, it is necessary for the control/diagnostic system 26 to know the communication protocol or format used by the device so that the device will be able to properly interpret the received commands or information. The control/diagnostic computer 26 can look up the protocol or communication format in a data base in order to transmit the desired information or commands. Communication can also be initiated by the device which transmits a command, request, data, or a request for diagnosis or an indication of a problem and the control/diagnostic system will then respond and/or transmit data or commands back to the device including commands to manipulate or change data, a command instructing a reading of data, or a command to perform an electrical-mechanical operation. When communication is initiated by the device, the control/diagnostic system 26 must determine the protocol of the incoming communication based on the teachings described herein in order to properly interpret the received information.

Figure 2:
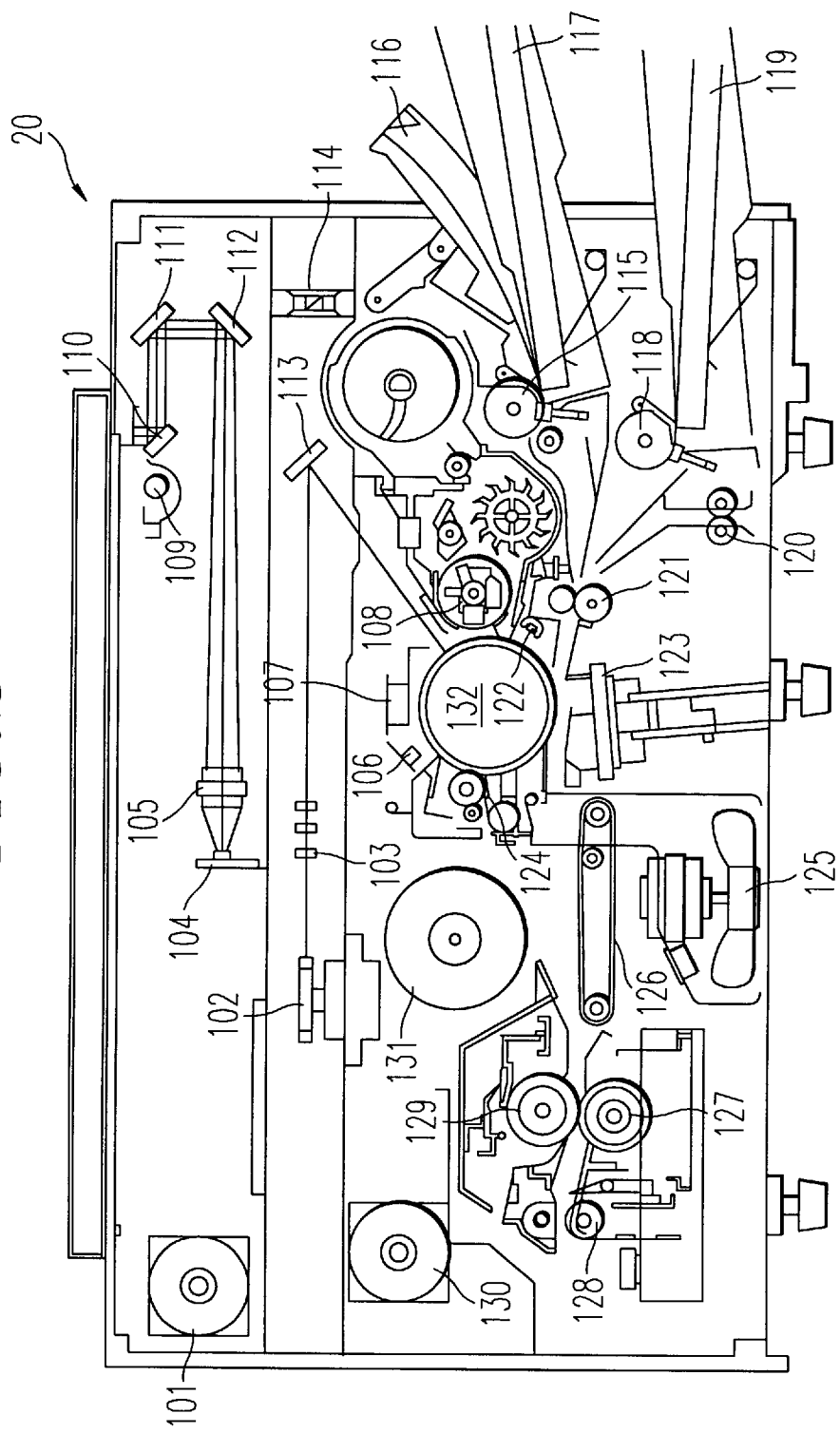
FIG. 2 illustrates the components of a digital copier/printer.

FIG. 2 illustrates the mechanical layout of the digital copier/printer 20 illustrated in FIG. 1. In FIG. 2, 101 is a fan for the scanner, 102 is a polygonal mirror used with a laser printer, and 103 designates an Fθ lens used to collimate light from a laser (not illustrated). Reference numeral 104 designates a sensor for detecting light from the scanner, 105 is a lens for focussing light from the scanner onto the sensor 104, and 106 is a quenching lamp used to erase images on the photoconductive drum 132. There is a charging corona unit 107 and a developing roller 108. Reference numeral 109 designates a lamp used to illuminate a document to be scanned and 110, 111 and 112 designate mirrors used to reflect light onto the sensor 104. There is a drum mirror 113 used to reflect light to the photoconductive drum 132 from the polygon mirror 102 from a laser. Reference numeral 114 designates a fan used to cool the charging area of the digital copier/printer, and 115 is a first paper feed roller used for feeding paper from the first paper cassette 117, and 116 is a manual feed table. Similarly, 118 is a second paper feed roller for the second cassette 119. Reference numeral 120 designates a relay roller, 121 is a registration roller, 122 is an image density sensor and 123 is a transfer/separation corona unit. Reference numeral 124 is a cleaning unit, 125 is a vacuum fan, 126 illustrates a transport belt, 127 is a pressure roller, and 128 is an exit roller. Reference numeral 129 is a hot roller used to fix toner onto the paper, 130 is an exhaust fan and 131 is the main motor used to drive the digital copier.

Figure 3:
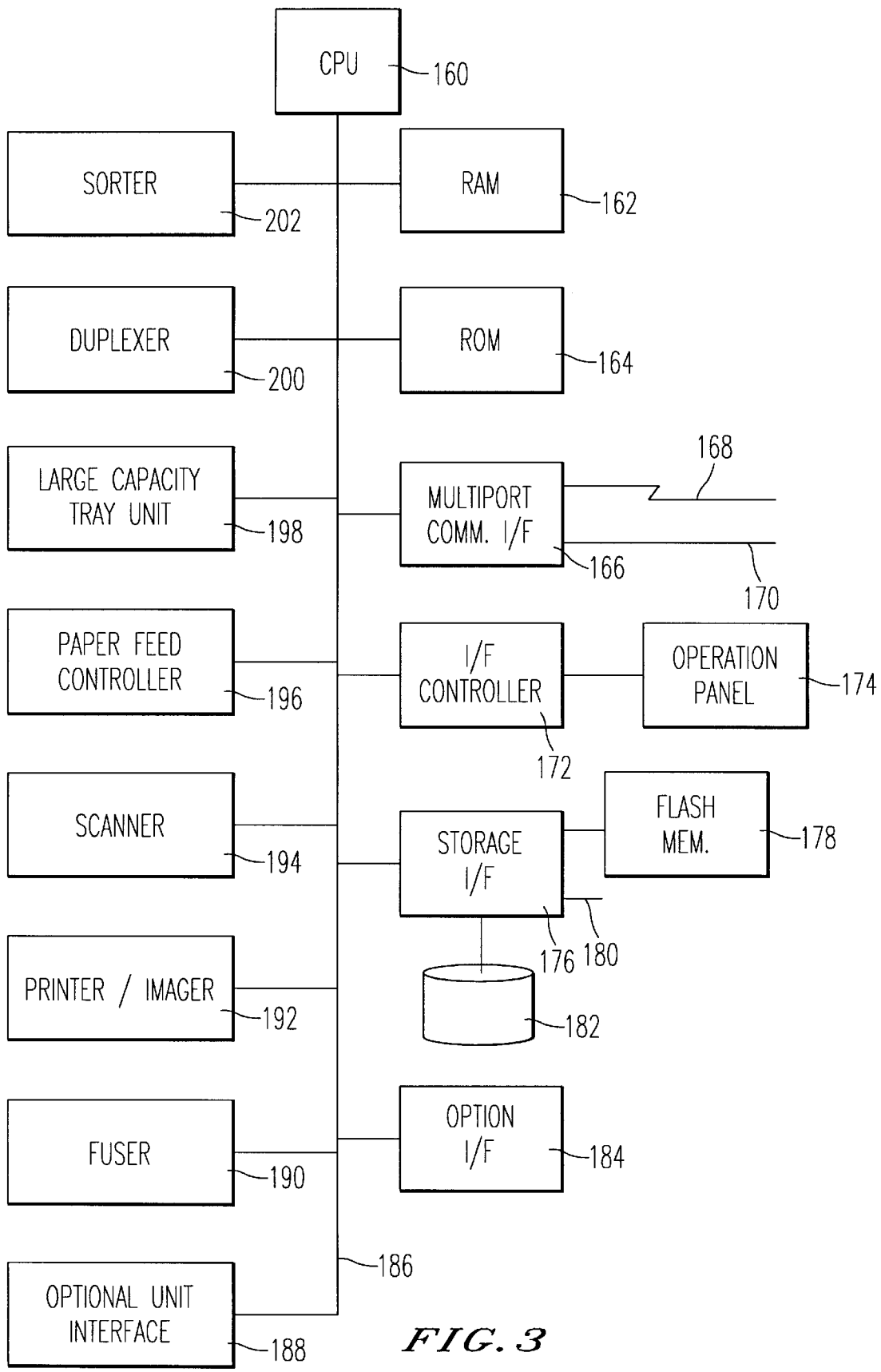
FIG. 3 illustrates electronic components of the digital copier/printer illustrated in FIG. 2.

FIG. 3 illustrates a block diagram of the electronic components illustrated in FIG. 2. The CPU 160 is a microprocessor and acts as the system controller. There is a random access memory 162 to store dynamically changing information including operating parameters of the digital copier. A read only memory 164 stores the program code used to run the digital copier and also information describing the copier (static-state data) such as the model number and serial number of the copier.

There is a multi-port communication interface 166 which allows the digital copier to communicate with external devices. Reference numeral 168 represents a telephone or ISDN line and 170 represents a network. Further information of the multi-port communication interface is described with respect to FIG. 4. An interface controller 172 is used to connect an operation panel 174 to a system bus 186. The operation panel 174 includes standard input and output devices found on a digital copier including a copy button, keys to control the operation of the copier such as number of copies, reducement/enlargement, darkness/lightness, etc. Additionally, a liquid crystal display is included within the operation panel 174 to display parameters and messages of the digital copier to a user.

A storage interface 176 connects storage devices to the system bus 186. The storage devices include a flash memory 178 and a disk 182. The disk 182 includes a hard disk, optical disk, and/or a floppy disk drive. There is a connection 180 connected to the storage interface 176 which allows for additional memory devices to be connected to the digital copier. The flash memory 178 is used to store semi-static state data which describes parameters of the digital copier which infrequently change over the life of the copier. Such parameters include the options and configuration of the digital copier. An option interface 184 allows additional hardware such as an external interface to be connected to the digital copier.

On the left side of FIG. 3, the various sections making up the digital copier are illustrated. Reference numeral 202 designates a sorter and contains sensors and actuators used to sort the output of the digital copier. There is a duplexer 200 which allows a duplex operation to be performed by the digital copier and includes conventional sensors and actuators. The digital copier includes a large capacity tray unit 198 which allows paper trays holding a large number of sheets to be used with the digital copier. The large capacity tray unit 198 includes conventional sensors and actuators.

A paper feed controller 196 is used to control the operation of feeding paper into and through the digital copier. A scanner 191 is used to scan images into the digital copier and includes conventional scanning elements such as a light, mirror, etc. Additionally, scanner sensors are used such as a home position sensor to determine that the scanner is in the home position and a lamp thermistor to ensure proper operation of the scanning lamp. There is a printer/imager 192 which prints the output of the digital copier and includes a conventional laser printing mechanism, a toner sensor, and an image density sensor. The fuser is used to fuse the toner onto the page using a high temperature roller and includes an exit sensor, a thermistor to assure that the fuser is not overheating, and an oil sensor. Additionally, there is an optional unit interface 188 used to connect to optional elements of the digital copier such as an automatic document feeder, a different type of sorter/collator, or other elements which can be added to the digital copier.

Figure 4:
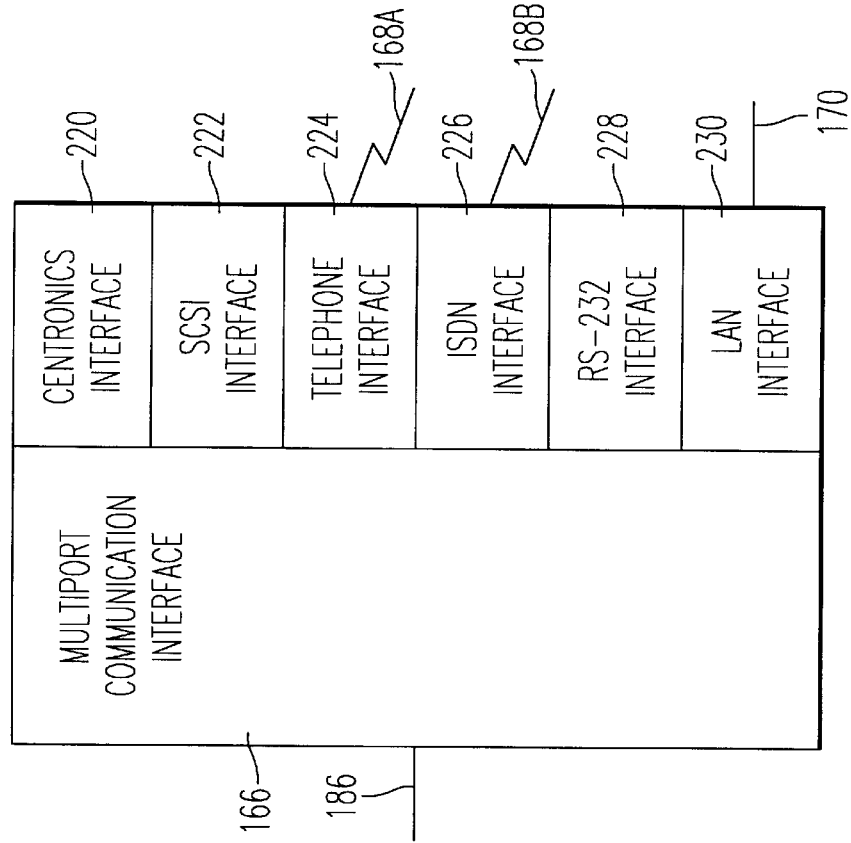
FIG. 4 illustrates the details of the multi-port communication interface illustrated in FIG. 3.

FIG. 4 illustrates details of the multi-port communication interface 166. The digital copier may communicate to external devices through a Centronics interface 220 which receives or transmits information to be printed, a SCSI interface 222, a conventional telephone interface 224 which connects to a telephone line 168A, an ISDN interface 226 which connects to an ISDN line 168B, an RS-232 interface 228, and a LAN interface 230 which connects to a LAN 170. A single device which connects to both a Local Area Network and a telephone line is commercially available from Megahertz and is known as the Ethernet-Modem.

The CPU or other microprocessor or circuitry executes a monitoring process to monitor the state of each of the sensors of the digital copier, and a sequencing process is used to execute the instructions of the code used to control and operate the digital copier. Additionally, there is a central system control process executed to control the overall operation of the digital copier and a communication process used to assure reliable communication to external devices connected to the digital copier. The system control process monitors and controls data storage in a static state memory such as the ROM 164 of FIG. 3, a semi-static memory such as the flash memory 178 or disk 182, or the dynamic state data which is stored in a volatile or non-volatile memory such as the RAM 162 or the flash memory or disk 182. Additionally, the static state data may be stored in a device other than the ROM 164 such as a non-volatile memory including either of the flash memory 178 or disk 182.

The above details have been described with respect to a digital copier but the present invention is equally applicable to other business office machines such as a facsimile machine, a scanner, a printer, a facsimile server, or other business office machines or any other type of machine. Additionally, the present invention includes other types of machines which operate using a connection-mode or connectionless-mode of communication such as a metering system including a gas, water, or electricity metering system, vending machines, or any other device which performs mechanical operations, has a need to be monitored, and performs a function. In addition to monitoring special purpose machines, and computers, the invention can be used to monitor, control, and diagnose a general purpose computer.

Figure 5:
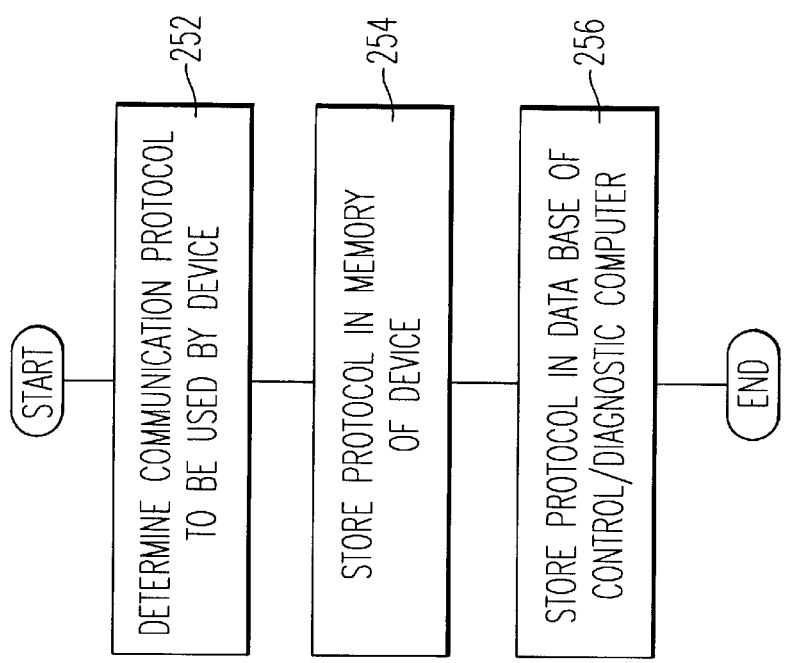
FIG. 5 illustrates the process of storing the communication protocols in the machine to be communicated with and the control/diagnostic system.

Before any communication is performed, it is necessary to determine the protocol which is to be used with a new machine such as a business office device. This determination will be made by an engineer or designer of the machine. After starting in FIG. 5, step 252 is performed which determines the communication protocol to be used by the device. After the protocol is determined, this communication protocol is stored in a memory of the device in step 254 and also stored in the data base of the control/diagnostic system in step 256, if the protocol is not already stored in the data base of the control/diagnostic system. The process of FIG. 5 then ends.

The communication protocols which are utilized by the invention are any type of communication protocol including known communication protocols. The data is formatted into any one of a variety of formats including formats which first describe the type of data which is followed by that data or the value of the data (e.g., type-value or TV). The data may also be formatted into fields such as the type followed by three value fields (TVVV). In these cases, the length of the fields is fixed, although it is possible to have varying length of fields also. A third type of formatted data which may be used by the invention is the transmission of data in a binary format without type or length information. In this case, the format is fixed with a sequence of values with fixed lengths. Another type of format of the data which may be used is type, length, and value (TLV) which begins with a field describing the type of data, a field describing the length of the data to follow, followed by the data itself, also referred to as a value. A fifth type of formatted data which the invention can use is type, value, and delimiter, the delimiter indicating the end of the data.

A preferable form of transmitted data is illustrated in FIG. 6 which shows the format of a transmission 260. The transmission begins with a protocol ID 262 which includes an identifier of the protocol and preferably a version number of the protocol ID. Following the protocol ID 262 is a device ID 264, also referred to as a header. Next is the formatted data 266 which uses any one of the previously described formats such as type-value, type-value-value-value, binary, type-length-value, or type-value-delimiter.

The protocol ID, and preferably the protocol ID and a version number of the protocol ID contained therein defines the format of the device ID or header 264 which is to follow. An exemplary device ID 264 is also illustrated in FIG. 6 and begins with a field defining the category of the device 270 such as whether the device is a copier, facsimile machine, etc. Also included is a model identification 272 of the device, a serial number 274 of the device, a version of the protocol used to communicate the formatted data, and a location or address of the device. The location or address of the device field 278 includes information such as a street address, a phone number, an e-mail address, or any other type of unique identifier which can be used to determine the location of the device. As explained above, the exact arrangement or format of the device ID or header changes and corresponds to the specific protocol ID 262.

FIG. 7 illustrates the protocol identifier data base. This data base is used to determine the format of the header or device ID after the protocol identifier 262 has been determined. The fields of each record in the protocol identifier data base include the protocol identifier, the version of the identifier, also referred to as the version of the header, and the actual format of the header.

The protocol identifier field can contain any sequence of bits, bytes, or characters which are unique in nature and will be readily identifiable as a protocol identifier. For example, the first record in the protocol identifier data base has a protocol identifier of ABABBCBCCDCD. This is a fairly unique sequence and will not ordinarily appear in communications. Therefore, this unique sequence is an acceptable protocol identifier. The next field in the protocol identifier data base is the identifier version, also referred to as the header version. This field is used to allow the format of the header to be changed while keeping the same basic protocol identifier. It can be seen in the protocol identifier data base that the protocol identifier fields of the first and second records are the same. However, these two records have different identifier versions, allowing different formats for the header. For example, it is seen in FIG. 7 that the second record has the format of the serial number allocated using 20 bytes whereas the first record has the format of the serial number using only 15 bytes. This change in the number of bytes for the serial number or any change to the device ID (header) can be easily implemented by adding a new record into the protocol identifier data base. The third record in the protocol identifier data base illustrates a third protocol identifier, its version, and the corresponding format of the header.

After the protocol identifier and identifier version of the transmission are analyzed in order to determine the format of the header, the device ID or header can be parsed to determine the information therein using the format of header field which is stored in the protocol identifier data base. After this information contained in the format of the header is determined, the communication format is determined using the input format data base illustrated in FIG. 8.

The input format data base illustrated in FIG. 8 contains a plurality of records having fields for information of the category of the device, the model ID, the version of the protocol, the format type, the actual format used for communication, also referred to as the input format, and the number of machines which are in existence which correspond to this specific record. When the device ID of an incoming transmission to the control/diagnostic system 26 is parsed to determine the information including the category of the device, the model ID, and the version of protocol being used, this information is used to search for a corresponding record in the input format data base in order to determine the format of the data which follows. For example, if the device ID indicates that the category of the device is a copier, the models ID is "FT1150" in the version of the protocol to be used is 1.0, the first record of the input format data base matches this record and the format type will be found to be "B" which indicates that the communication format used is binary, and the incoming communications will use the input format which includes a 32 bit integer which indicates a copy count and a 16 bit integer which indicates a jam count.

In the present application, the content of the formatted data which is received can be defined in any manner. One manner of defining this content is illustrated in the Input Format field of the input format data base illustrated in FIG. 8. other manners of defining fields are set forth in Table 1 below.

TABLE 1

| Type/Length, Field Def. | | | |
|---|---|---|---|
| Int/32 | | | |
| Int/16 | | | |
| ASCII/N | | | |
| Byte/N, Field def ((Bit N | ), | (JIS/X, | )) |
| Bit/N | | | |
| JIS/X | X: | Unknown | |
| SHIFT_JIS/X | X: | Unknown | |

Table 1 illustrates various manners of defining the format of data and the fields thereof. The data is defined beginning with its type such as Int indicating an integer. Other possible formats include ASCII format, whether the data is a byte, a bit, in JIS, or Shift_JIS. JIS and Shift_JIS are Japanese Industrial Standards which are known and conventional and serve the same purpose as ASCII.

Following the type is the Length. This length may be fixed such as being limited to 32 or 16 byte integers, or may be defined in the field, as indicated using "N". "X" means the length of information is unknown or undefined.

After the type/length, there is a field definition which is not illustrated for each entry. The field definition can be used to define any field such as a copy count, jam count, or any other parameter or information which is transmitted. In addition to field definitions, sub-fields may be defined. As an example, the field Byte/N has a field definition which includes two sub-fields. These sub-fields contain therein definitions of the data which is in the sub-fields.

Referring back to the input format data base, if the device ID indicates that the copier is model "FT20" and the version of the protocol used is 1.0, the format of the communication will be Type-Length-Value (TLV) and the input format will be "TLV format 1". This is a predefined format which is stored in another location such as a file or data base. Accordingly, this input format field of the input format data base does not have to store the entire definition of the input format which is the communication protocol but may just store the name of the protocol in order to simplify the structure of the input format data base, This also allows a plurality of devices to use the same input format and therefore does not require the format to be separately stored for each of the devices which use this input format.

The other records of the input format data base simply illustrate exemplary information and the exact details of the various records are not important. The third record illustrates the information for a facsimile machine, the fourth record illustrates the information for a printer, and the fifth record illustrates the information of a digital camera such as the Ricoh DC-1 digital camera which is described in U.S. patent application Ser. No. 08/603,551 filed on Feb. 21, 1996 and entitled "External Communication Interface for a Digital Camera", which is incorporated herein by reference.

The Number Installed field of the input format data base indicates the number of machines which are in existence which correspond to the device described in the record. This number can be used to sort the data base or for any other purpose, as desired.

It is possible for a communication received by the control/ diagnostic system 26 to begin without a protocol ID. In this case, neither the protocol identifier data base illustrated in FIG. 7 nor the input format data base illustrated in FIG. 8 will be used to determine the communication format. Instead, the communication protocol data base illustrated in FIG. 9 is used to determine the communication protocol (the format of the data) which is being used. The communication protocol data base includes records having fields which define the device ID or header, the number of machines which support the protocol defined in the record, the method of identifying the protocol, the location of the data formats of the protocol, and critical fields which are used to identify the protocol.

When no protocol identifier is contained in the incoming communication, the incoming communication is checked to see if its format matches any one of a number of predefined formats set forth in the communication protocol data base. The field in the communication protocol data base called the critical fields which identify the protocol defines values of fields of the incoming communication which must be matched in order to find that the communication matches the record in the communication protocol data base.

TABLE 2

CRITICAL FIELDS (B10,48–57) (B11,48–47) (B13, 48–57) (B14, 48–57)
(B15,255) (b120,1) (B20, 48–57) (B21,48–57)
(B22, 48–57) (B23, 48–57)
(b0,1) (b1,1) (b2,1) (b8,1) (b9,1) (b10, 1)
(b255,0) (b256,0) (b257,1) (b258,1)

Table 2 which illustrates the critical fields includes a first entry which is utilized with the first record in the communication protocol data base and a second entry which is used with the second record of the communication protocol data base. The first entry in the above table begins (B10, 48–57), (B11, 48–57) etc. The information between each set of parenthesis defines a critical limitation. The capital letter "B" followed by the 10 indicates that byte 10 of the incoming communication must have a value between and including 48 and 57. This corresponds to the ASCII representation of numerals zero through nine. Similarly, the other critical fields of the first entry in the table define other requirements of the various bytes.

The second entry in Table 2 uses lower case "b"'s to indicate requirements of individual bits within the incoming communication. For example, (b0, 1) indicates that bit zero of the received communication must have the value 1.

The present invention analyzes incoming communications without protocol identifiers by first determining if an incoming communication matches the critical fields defined in the communication protocol data base. The communication protocol data base includes a field defining the number of machines supporting the protocol. This allows the critical fields to be checked beginning first with the most popular communication protocol in order to most efficiently use the search time and the most likely to obtain a match within the communication protocol data base.

Once a record within the communication protocol data base has been identified as corresponding to an incoming communication protocol, the method of identifying protocol within the record of the communication protocol data base is examined to determine how the communication protocol is to be examined. Two method of identifying the protocol to be used include reading an identification within the header of an indication of the protocol to be used, or a fixed format identification, meaning there is only one unique communication protocol which corresponds to the critical fields.

When the header identification method is to be utilized to determine the communication protocol, the header must be read to determine an identification therein which indicates the data format to be used. In this case, the device ID or header field within the record of the communication protocol must be examined to determine the location of the format ID contained within the header. As an example, the device ID or header within the communication protocol data base may be the same or similar as the device ID (header) 264 illustrated in FIG. 6 but additionally contain a Format ID field which is read to determine which of the plurality of data formats corresponding to the critical fields of the first record are to be utilized. For example, the format ID is stored in bytes 20–23 of the received communication. Once the format ID is determined, the data base defined in the location of data formats of protocol field of the communication protocol data base is searched to determine the actual data format. For example, the data base "CSSDATA.DB" is illustrated in FIG. 10 is utilized. In FIG. 10, the data base is illustrated as containing a format ID field, a format type field, and the actual data format. Once the device ID of the incoming communication is read, the format ID contained within the header can be determined and the data base, for example illustrated in FIG. 10, utilized to determine the data format.

FIGS. 11A–11D illustrate a process for determining the communication protocol which is used by a communication. This process is preferably performed by the control/diagnostic system 26 but may be performed by any device which receives communications which must have the format thereof determined. After starting, step 302 receives the initial communication. Step 304 then checks if the communication which has been received begins with a protocol identifier such as a protocol identifier defined in the protocol identifier data base. If it does, step 306 searches the protocol identifier data base illustrated in FIG. 7 for the protocol identifier and the identifier or header version. This step is a search of the records within the protocol identifier data base for a record matching the protocol identifier and a version of the received communication. Alternatively, the identifier version can be omitted from the protocol identifier data base and from the checking. Step 308 then determines if the protocol identifier and the version are found within a record of the protocol identifier data base. If they are not found within this data base, an error is returned. As an alternative to returning an error, flow proceeds to process B illustrated in FIG. 11C to determine the communication protocol, as if the protocol identifier did not exist.

If step 308 determines that there is a corresponding protocol identifier and version found within the protocol identifier data base, flow proceeds to step 310 which reads the format of the header from the protocol identifier data base. In step 312, the device ID or header (e.g., 264 of FIG. 6) is parsed in order to determine the information within the various fields of the header, using the format of the header which was located in the protocol identifier data base. Step 314 then searches the input format data base illustrated in FIG. 8 for a record matching the device defined within the fields of the device ID (header). For example, the input format data base is searched for the category of the device, the model ID, and the version of the protocol. If step 316 determines that a matching record within the input format data base has not been found, an error is returned. Alternatively, if a matching record is found, step 318 reads the format type and input format from the matching record of the input format data base and returns this format information to the process which called the process of the FIGS. 11A–11D (e.g., a main routine for processing incoming communications of the control/diagnostic system 26).

Figure 11A:
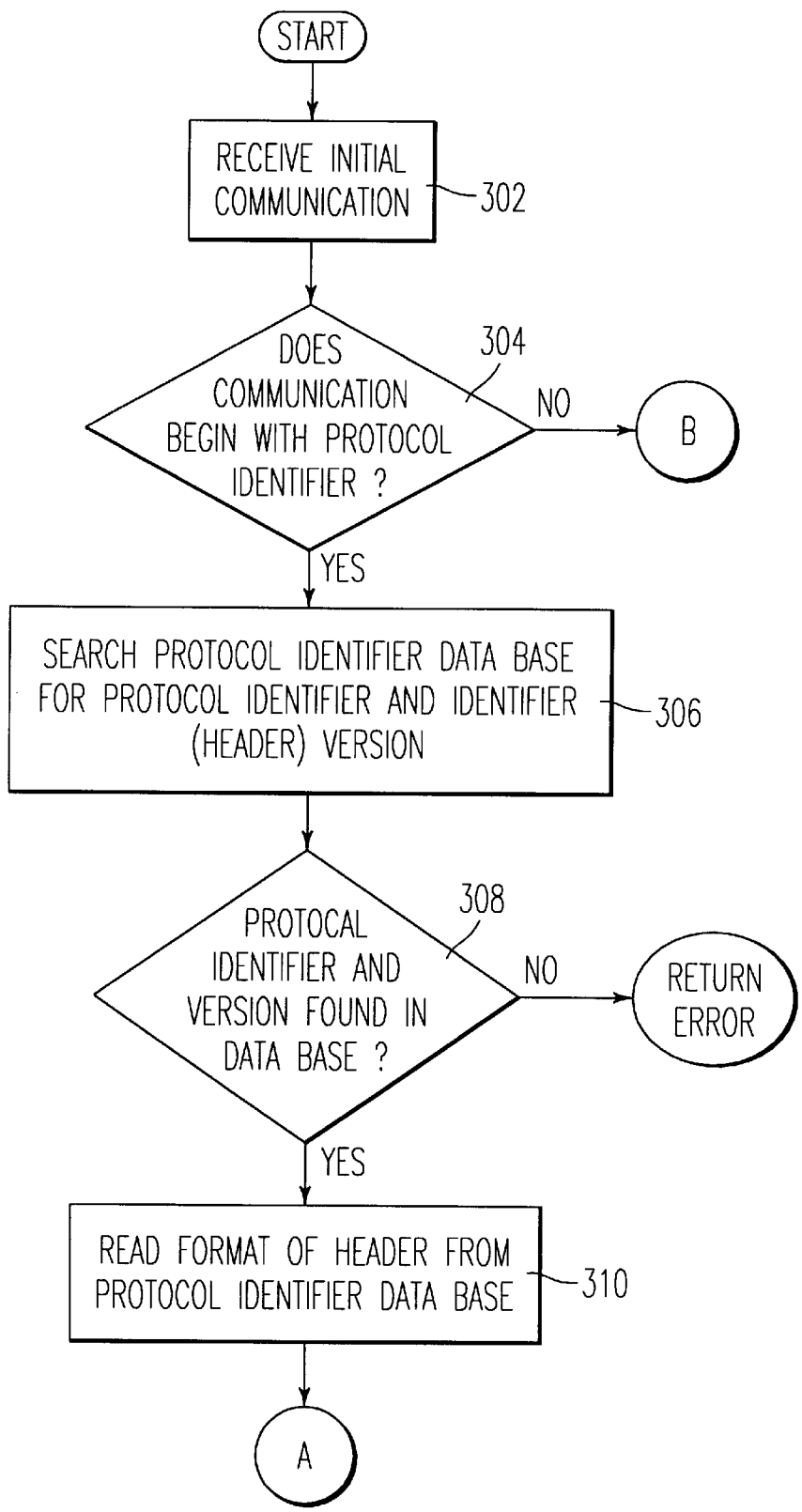
FIGS. 11A–11D illustrate a flowchart which determines which communication protocol is utilized by a received communication.
Figure 11B:
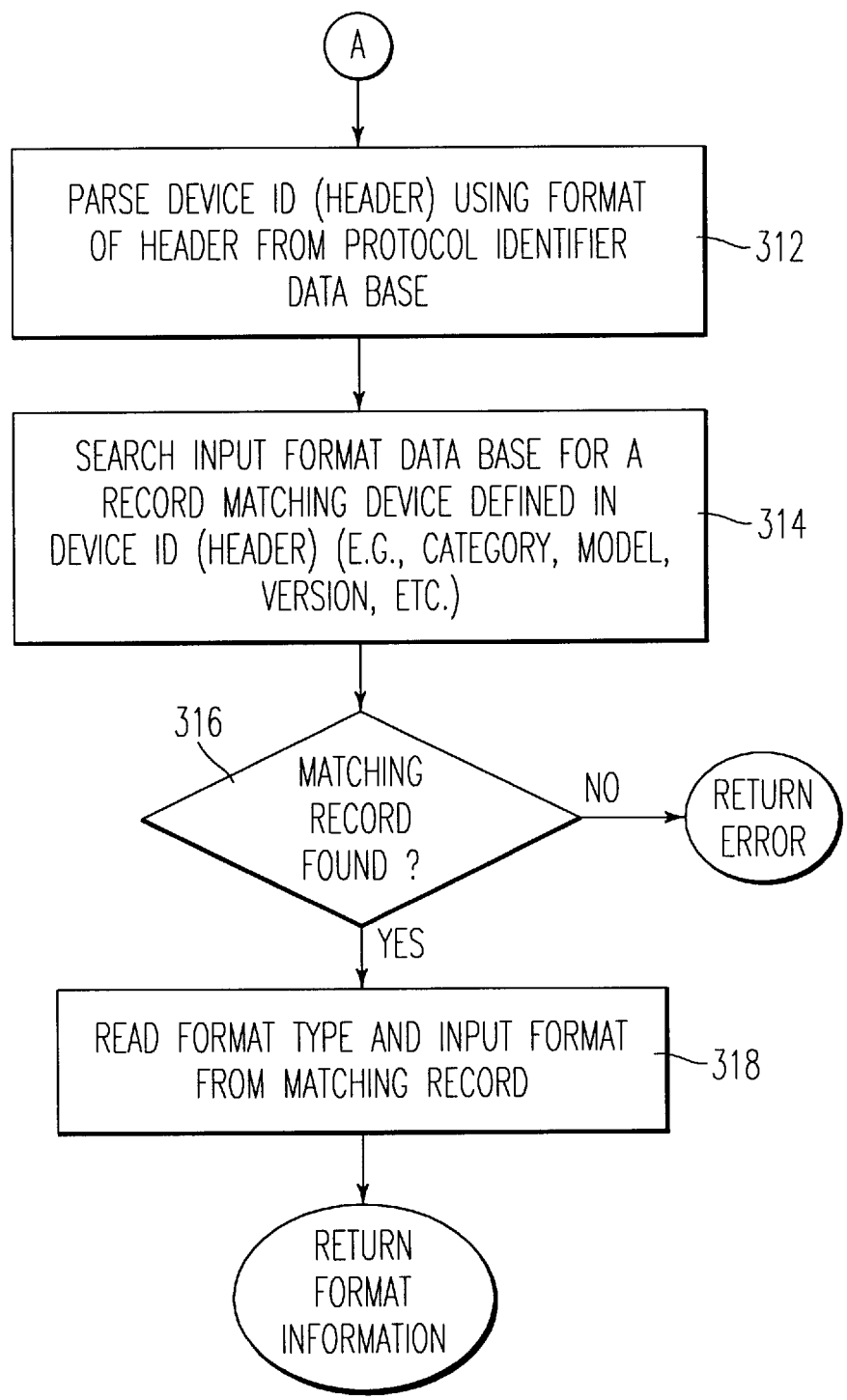
Figure 11C:
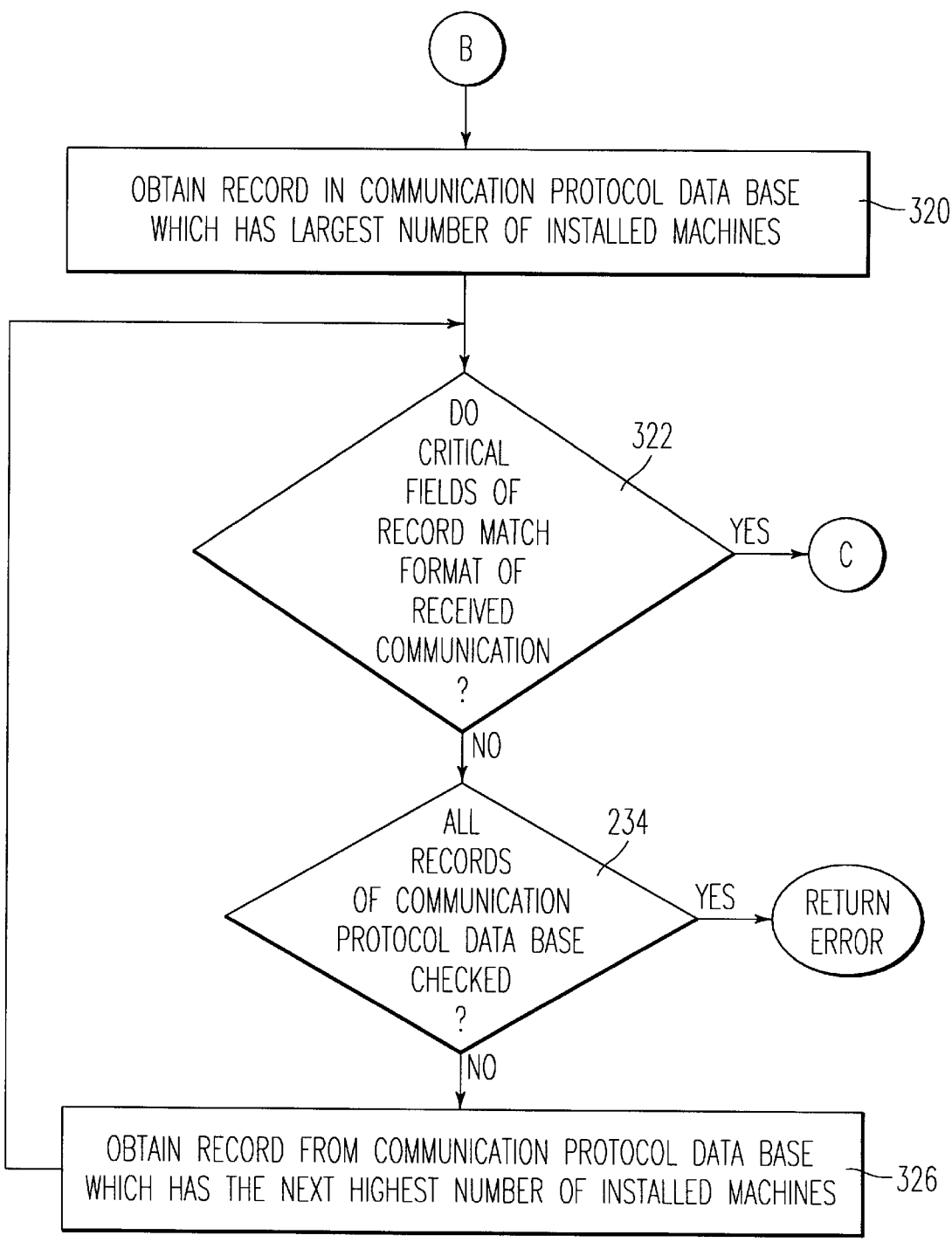
Figure 11D:
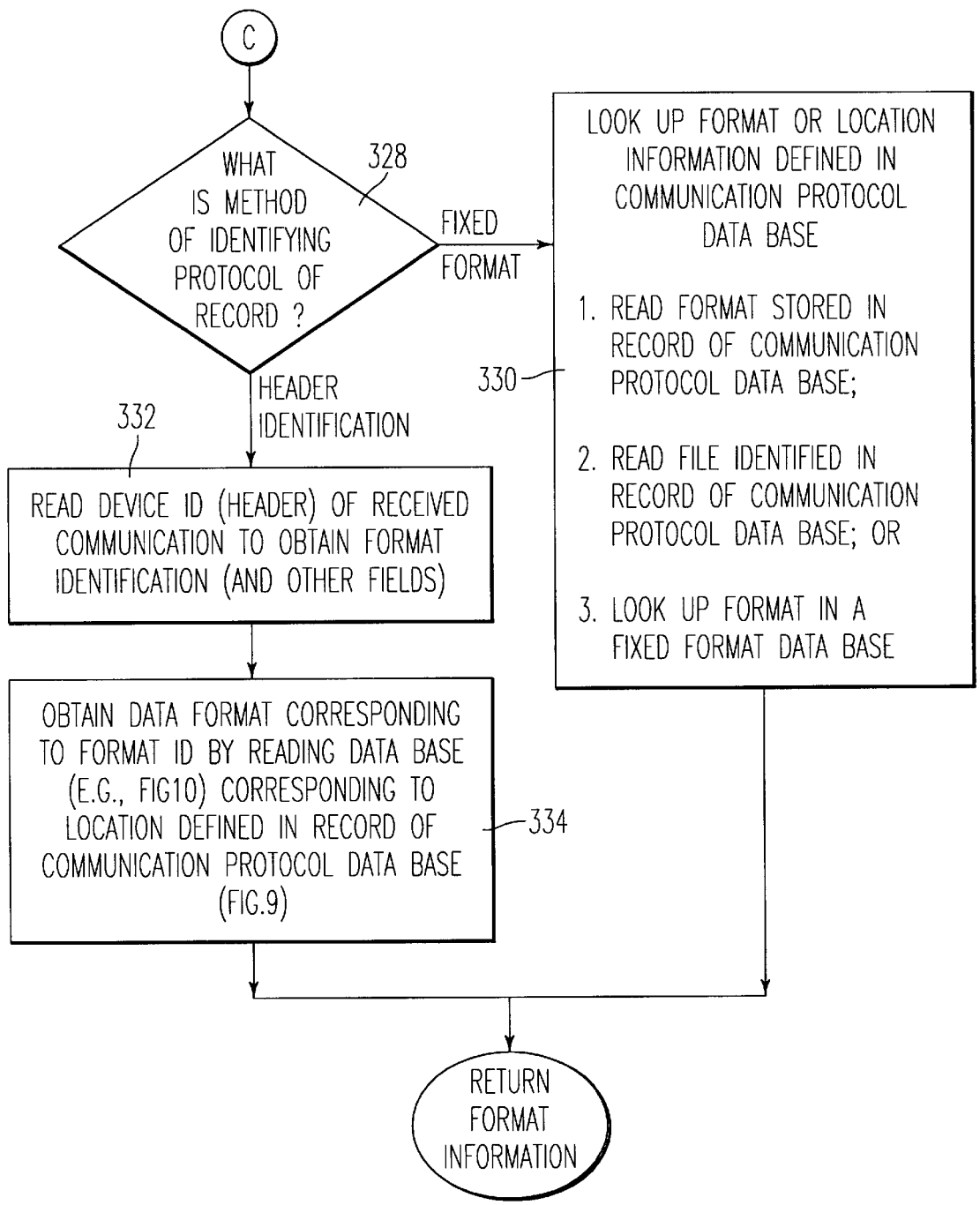

The flowchart illustrated in FIG. 11C is called when the received communication does not begin with a protocol identifier and can also be used when the protocol identifier which is used by the received communication is found. In FIG. 11C, step 320 obtains the record in the communication protocol data base which has the largest number of installed machines. For example, the first record in the communication protocol data base contains 99,000 machines which support the protocol defined by this record. Step 322 then determines if the critical fields of this record match the format of the received communication. This is determined by examining if the requirements for the critical field match the construction of the received communication. If they do not, step 234 checks to see if all records of the communication protocol data base have been checked. If all records have been checked, an error is returned indicating that no communication protocol which matches the received communication has been found. Alternatively, if all records have not been checked, flow proceeds from step 324 to step 326 which obtains a record from the communication protocol data base which has the next highest number of machines and flow returns to step 322 which determines if this record matches the critical fields. If the fields are determined to match in step 322, flow proceeds to step 328 in FIG. 11D which reads the "method of identifying protocol" field within the communication protocol data base in order to determine the method used to identify the protocol. If the method used to identify the protocol is a header identification method, flow proceeds to step 332 which reads the device ID (header) utilizing the defined format of the header set forth in the communication protocol data base in order to locate the format ID field. Step 334 then reads the data base defined in the location of data formats of protocol of the communication protocol data base (e.g., FIG. 10) in order to determine the data format which is utilized by the received communication. The format information is then returned.

If step 328 determines that the method of identifying the protocol of the record is a fixed format identification, meaning there is only one format which corresponds to the record which is matched with the critical fields of the incoming communication, step 330 determines the communication protocol in any one of three ways. First, the format is directly stored in the "location of data formats of protocol" field, and this field is read in order to determine the communication protocol. As an alternative, there is a file identified within the "location of data formats of protocol" field and this file is read in order to determine the communication protocol. As a further alternative, the "location of data formats of protocol" field identifies a data base which is searched in order to locate a record corresponding to the record in the communication protocol data base and this further data base is searched in order to find the format information. The format information which is found is then returned and the process ends.

Figure 12A:
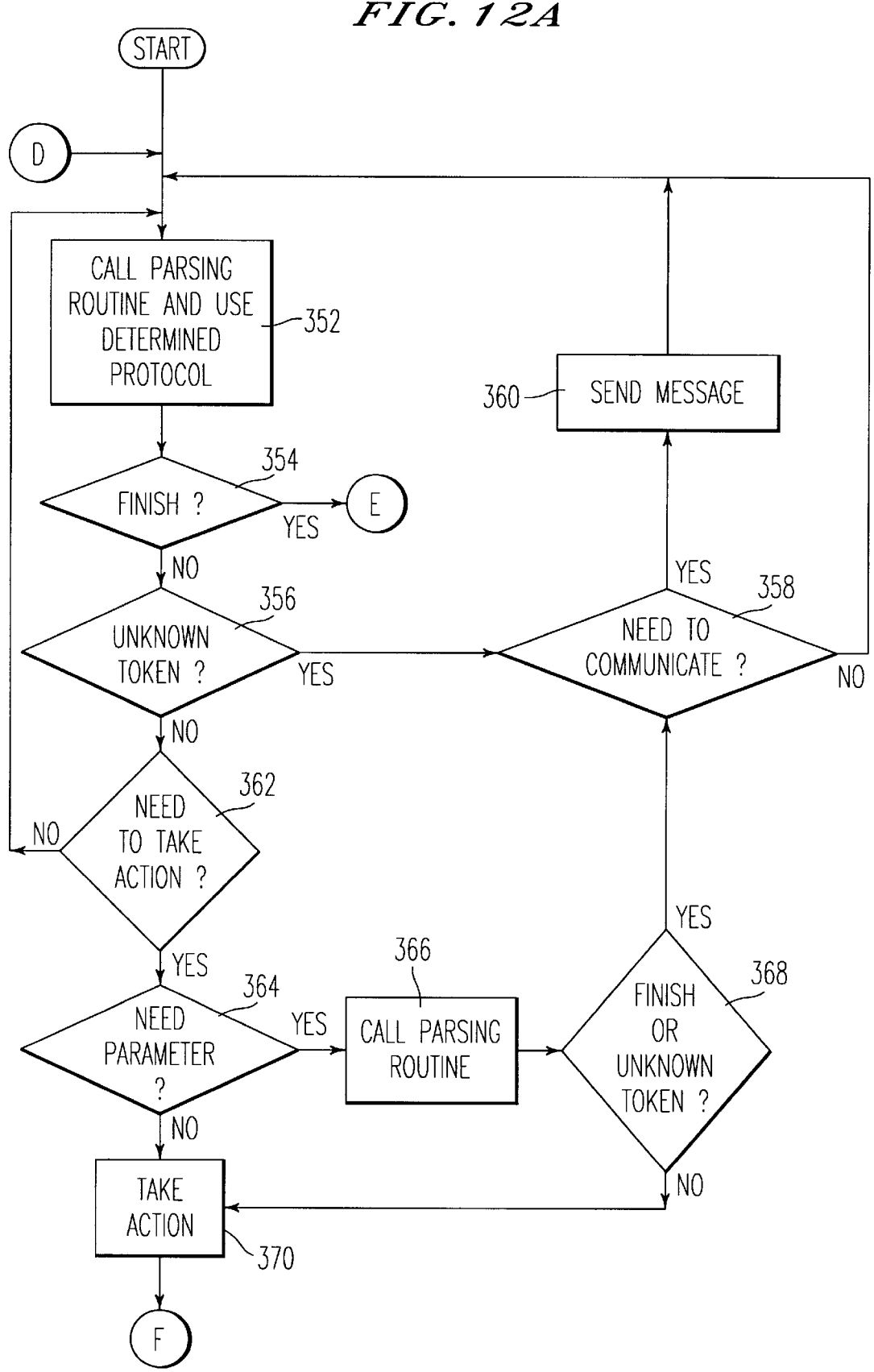
Figure 12B:
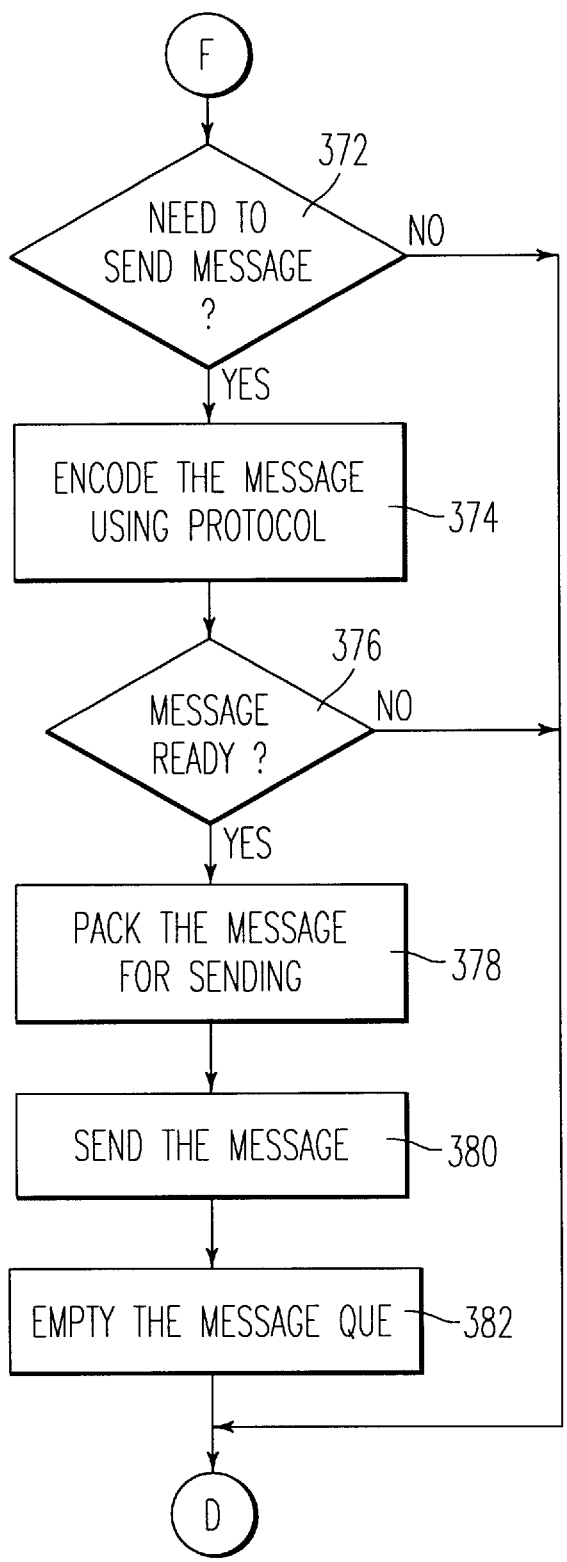

FIGS. 12A–12C illustrate a process for handling incoming communications performed by either the control/diagnostic system 26, or the device connected thereto. This process can be used to communication any information including the type of information which is communicated in U.S. Pat. No. 5,412,779 entitled "Method and Apparatus for Controlling and Communicating with Business Office Devices."

After the communication format or protocol is determined using the flowcharts of FIGS. 11A–11D, the process of FIG. 12 is started and a parsing routine is called in step 352 which parses the received formatted data such as the formatted data 266 illustrated in FIG. 6. The parsing is used to determine commands, parameters, or other information contained in the communication. Step 354 then determines if any other communication or function is to be formed or if the communication process is finished. If the communication process is finished, flow proceeds to process E illustrated in FIG. 12C. If the process is not finished, flow proceeds to step 356 which determines if there is an unknown token or section of a received communication. If there is, flow proceeds to step 358 which determines if there is a need to communicate this problem of an unknown token to the transmitting device. If there is a need to communicate, flow proceeds to step 360 which sends a message to the transmitting device indicating the problem of the unknown token. If there is no need to communicate, flow proceeds from step 358 back to the beginning of the flowchart illustrated in FIG. 12A.

If step 356 determines that there is not an unknown token, step 362 determines if an action needs to be taken. The action could be in response to a received command or a requirement for a change in or reading of memory contents. If an action does need to be taken, flow proceeds to step 364 which determines if a parameter is needed. If a parameter is needed, step 366 performs further parsing to determine the parameter. Step 368 then determines if the parsing is finished or there is a problem with an unknown token. If there is an unknown token, (yes in step 368), flow proceeds to step 358. Otherwise, if the process is determined to be finished in step 368 or step 364 determines that no parameters are needed, step 370 performs the necessary action. This can be any type of action including reading memory locations within the device, changing the content of a memory, operating components of the device, or any desired action. From step 370, flow proceeds to process F illustrated in FIG. 12B.

In FIG. 12B, step 372 determines if there is a need to send a message. If there is no need to send a message, flow returns to the beginning of FIG. 12A. If there is a need to send a message, flow proceeds from step 372 to 374 which encodes the message using the previously determined communication protocol. Step 376 then determines if the message is ready, meaning is the message complete and ready to send or is it necessary to wait? If the message is not ready to send, the message is placed in a buffer or queue and flow proceeds back to the beginning of the process illustrated in FIG. 12A. If step 376 determines that the message is ready to send, flow proceeds to step 378 which packs the message into a packet for transmission. Step 380 then transmits the message and step 382 empties a message queue. Flow then returns back to the beginning of the process illustrated in FIG. 12A.

If step 354 determines that the communication process is finished, flow proceeds to process E illustrated in FIG. 12C. In FIG. 12C, step 384 determines if the message queue is empty. If it is, the process ends. If the message queue is not empty, step 386 packs the message for sending into packets, step 388 transmits the message, and step 390 empties the message queue. The communication process then ends.

FIG. 13 is a first example utilized to explain the operation of the invention. In both the examples of FIG. 13 and FIG. 14, there is a top row which indicates byte number and a bottom row which indicates the content of the communication. The example in FIG. 13 is a received communication which begins with a protocol identifier including a version number in bytes 1–8. The protocol identifier is ABABBCB-CCDCD followed by a version number in bytes 7 and 8 which is 0101. Next, bytes 9–12 indicate the category of the device followed by bytes 13 through 22 which includes the model ID. Next, bytes 23 through 37 are a fifteen byte serial number followed by bytes 38–42 which are five bytes of the version of the protocol. Next in FIG. 13 are bytes 43–92 which is a fifty byte device location. In this particular example, bytes 43–45 are used to indicate the type of information contained in the address, zero being used for a street address, 1 being used for a phone number, and 2 being used for an e-mail address. In this example, as the value of bytes 43–45 is one, the information which follows is a phone number.

Bytes 93–98 are the formatted data which has been communicated. The formatted data is in the Type-Value format and contains two bytes of the type which is 8001 followed by four bytes of the content in bytes 95–98 which indicates an abnormal jam count.

In order to read the actual formatted data in bytes 93–98, the present invention determines that the communication begins with a protocol identifier in bytes 1–8 and looks up the format of the header contained in bytes 9–92 in the protocol identifier data base illustrated in FIG. 7. The first record of the protocol identifier data base in FIG. 7 matches the protocol identifier and version contained within FIG. 13. Once the information is read within the header (bytes 9–92), the input format data base is searched to find information matching the information in the header. There is no record in the input format data base illustrated in FIG. 8 which corresponds exactly to FIG. 13. However, in reality and when there is proper operation of the invention, such a record would exist. In this case, the version of the protocol contained in bytes 38–42 would indicate that the formatted data will be in the type-value format. The information following byte 92 will be parsed according to the specific type-value format which has been previously defined and stored in the control/diagnostic system.

FIG. 14 is a second example of a received communication. This example does not begin with a protocol identifier. Accordingly, the control/diagnostic system will analyze the format of the transmitted information to determine if there are critical fields which match the received communication. In this example, the received communication matches the critical fields defined in the first entry of Table 2 of the specification which corresponds to the first record in the communication protocol data base of FIG. 9. Accordingly, the device ID or header format will be looked up in the communication protocol data base to determine that bytes 20–23 contain a format ID. The value of bytes 20–23 is two. This format ID is looked up in the data base illustrated in FIG. 10 which indicates that the data which follows will be a 32 bit integer indicating a copy count. The copy count is indicated in bytes 24–27 of the example in FIG. 14.

The various data bases utilized by the invention are easily updated, upgraded, and expanded, giving great flexibility in the use of new communication protocols. Further, if the control/diagnostic system 26 knows which protocol the machine being monitored is using, communication is easily initiated by the control/diagnostic system 26. Further, the teachings of the use of data bases may also be applied to the device or machine being monitored.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of communicating, comprising the steps of:
   transmitting information from a first device to a second device;
   receiving, by the second device, the information which has been transmitted;
   determining, by the second device, a communication protocol utilized by the first device by looking up an identifier contained within the information to determine a format of a header of the transmission, parsing the header of the transmission using the format of the header which was determined, and determining the communication protocol using information in the header which was parsed using the format of the header; and
   parsing, by the second device, the information transmitted by the first device using the communication protocol which has been determined.

2. A method according to claim 1, wherein the determining step comprises:
   determining the communication protocol by examining if the information which has been transmitted includes the identifier.

3. A method according to claim 1, wherein the determining step comprises:
   determining the communication protocol by examining if the information which has been transmitted includes a communication protocol identifier.

4. A method according to claim 1, wherein the determining step comprises:
   determining if the information which has been transmitted has a plurality of fields having a same format as one of a plurality of predetermined formats by sequentially comparing the plurality of fields with the plurality of predetermined formats in an order starting with a predetermined format which is most common.

5. A method according to claim 4, wherein the determining step comprises:
   determining if the information which has been transmitted has a plurality of fields having a same format as one of a plurality of predetermined formats by sequentially comparing the plurality of fields with the plurality of predetermined formats in a generally descending order from most common format to least common format.

6. A method according to claim 5, further comprising the step of:
   sorting the predetermined formats from most common format to least common format.

7. A method according to claim 1, further comprising the step of:
   looking up, after the step of determining, information of the communication protocol utilized by the first device in a data base containing a plurality of communication protocols,
   wherein the parsing step comprises parsing the information transmitted by the first device using the information of the communication protocol determined in the step of looking up.

8. A method of communicating, comprising the steps of:
   transmitting information from a first device to a second device;
   receiving, by the second device, the information which has been transmitted;
   determining, by the second device, a communication protocol utilized by the first device by determining if the information which has been transmitted is arranged in a same format as a predetermined format; and
   parsing, by the second device, the information transmitted by the first device using the communication protocol which has been determined.

9. A method according to claim 8, wherein the step of determining examines said predetermined format which indicates values which must exist in order to determine if there is the same format.

10. A method according to claim 9, wherein the step of determining examines said predetermined format which indicates values of at least one of bits and bytes which must exist in order to determine if there is the same format.

11. A method of communicating, comprising the steps of:
    transmitting information from a first device to a second device;
    receiving, by the second device, the information which has been transmitted;
    determining, by the second device, a communication protocol utilized by the first device by determining if the information which has been transmitted has a plurality of fields having a same format as one of a plurality of predetermined formats; and
    parsing, by the second device, the information transmitted by the first device using the communication protocol which has been determined.

12. A method according to claims 1, 8 or 11, wherein the transmitting step comprises:
    transmitting the information from a business office device.

13. A method according to claims 1, 8 or 11, wherein the transmitting step comprises:
    transmitting the information from the first device which is a copier.

14. A method according to claims 1, 8 or 11, wherein the transmitting step comprises:
    transmitting the information from the first device which is a printer.

15. A method according to claims 1, 8 or 11, wherein the transmitting step comprises:
    transmitting the information from the first device which is a facsimile machine.

16. A method according to claims 1, 8 or 11, wherein the transmitting step comprises transmitting the information from the first device which is a digital camera.

17. A system for communicating, comprising:
    a first device for transmitting information;
    a second device which receives the transmitted information from the first device, including:
       means for determining a communication protocol utilized by the first device including means for looking up the identifier in a data base to determine a communication protocol corresponding to the identifier, the means for looking up including:
          means for looking up the identifier in the data base to determine a format of a header of the transmission;
          means for parsing the header of the transmission using the format of the header which was determined; and
          means for determining the communication protocol using information in the header which was parsed using the format of the header; and
       means for parsing the information transmitted by the first device using the communication protocol which has been determined.

18. A system according to claim 17, wherein the means for determining comprises:

means for determining the communication protocol by examining if the information which has been transmitted includes the identifier.

19. A system according to claim 17, wherein the means for determining comprises:

means for determining the communication protocol by examining if the information which has been transmitted includes a communication protocol identifier.

20. A system according to claim 17, wherein the means for determining comprises:

means for determining if the information which has been transmitted has a plurality of fields having a same format as one of a plurality of predetermined formats by sequentially comparing the plurality of fields with the plurality of predetermined formats in an order starting with a predetermined format which is most common.

21. A system according to claim 20, wherein the means for determining comprises:

means for determining if the information which has been transmitted has a plurality of fields having a same format as one of a plurality of predetermined formats by sequentially comparing the plurality of fields with the plurality of predetermined formats in a generally descending order from most common format to least common format.

22. A system according to claim 21, further comprising:

means for sorting the predetermined formats from most common format to least common format.

23. A system according to claim 17, wherein the second device further comprises:

means for looking up information of the communication protocol utilized by the first device in a data base containing a plurality of communication protocols, wherein the means for parsing comprises means for parsing the information transmitted by the first device using the information of the communication protocol determined by the means for looking up.

24. A system for communication, comprising:

a first device for transmitting information;

a second device which receives the transmitted information from the first device, including:

means for determining a communication protocol utilized by the first device by determining if the information which has been transmitted is arranged in a same format as a predetermined format; and means for parsing the information transmitted by the first device using the communication protocol which has been determined.

25. A system for communication, comprising:

a first device for transmitting information;

a second device which receives the transmitted information from the first device, including:

means for determining a communication protocol utilized by the first device by determining if the information which has been transmitted has a plurality of fields having a same format as one of a plurality of predetermined formats; and means for parsing the information transmitted by the first device using the communication protocol which has been determined.

26. A system according to claims 17, 24 or 25, wherein:

the first device is a business office device.

27. A system according to claims 17, 24 or 25, wherein: the first device is a copier.

28. A system according to claims 17, 24 or 25, wherein: the first device is a printer.

29. A system according to claims 17, 24 or 25, wherein: the first device is a facsimile machine.

30. A system according to claims 17, 24 or 25, wherein: the first device is a digital camera.

31. A system according to claim 30, wherein the means for determining comprises:

means for examining said predetermined format which indicates values of at least one of bits and bytes which must exist in order to determine if there is the same format.

* * * * *